US006496514B2

(12) United States Patent
Su et al.

(10) Patent No.: US 6,496,514 B2
(45) Date of Patent: Dec. 17, 2002

(54) OLD-PORT NODE DETECTION AND HUB PORT BYPASS

(75) Inventors: Sam Su, Irvine, CA (US); David Baldwin, Irvine, CA (US); Qing Xue, Irvine, CA (US); Hossein Hashemi, Mission Viejo, CA (US)

(73) Assignee: Emulex Corporation, Costa Mesa, CA (US)

( * ) Notice: Subject to any disclaimer, the term of this patent is extended or adjusted under 35 U.S.C. 154(b) by 17 days.

(21) Appl. No.: 09/730,149

(22) Filed: Dec. 4, 2000

(65) Prior Publication Data

US 2002/0067738 A1 Jun. 6, 2002

(51) Int. Cl.[7] .......................... H04L 12/42; H04L 12/403
(52) U.S. Cl. ....................................... 370/452; 370/462
(58) Field of Search ................................ 370/216–225, 370/227, 228, 241, 242, 244, 248, 253, 400–405, 432, 437, 447, 450, 451, 452, 453, 454, 461, 462, 460; 709/239, 249, 250, 251; 714/712, 717, 726; 359/110

(56) References Cited

U.S. PATENT DOCUMENTS

| | | | | |
|---|---|---|---|---|
| 5,546,378 A | * | 8/1996 | Wirth et al. | 370/223 |
| 5,812,754 A | * | 9/1998 | Lui et al. | 714/6 |
| 5,978,379 A | * | 11/1999 | Chan et al. | 370/403 |
| 6,006,275 A | * | 12/1999 | Picazo, Jr. et al. | 709/249 |
| 6,192,027 B1 | * | 2/2001 | El-Batal | 370/222 |
| 6,192,054 B1 | * | 2/2001 | Chan et al. | 370/452 |

\* cited by examiner

*Primary Examiner*—Douglas Olms
*Assistant Examiner*—Phirin Sam
(74) *Attorney, Agent, or Firm*—Fish & Richardson P.C.

(57) ABSTRACT

A hub port in a Fibre Channel loop for detecting and bypassing attached node ports in an OLD-PORT state is disclosed. The hub port includes a hub data source, a detect circuits, and an output control circuit. The hub data source supplies data to the hub port from a Fibre Channel loop. The detect circuit is configured to detect a valid non-Arbitrated Loop sequence from an attached node port indicating that the node port is in an OLD-PORT state. The output control circuit operates to bypass the node port from the loop when the valid non-Arbitrated Loop sequence is detected.

20 Claims, 5 Drawing Sheets

OLD-PORT NODE DETECTION AND HUB PORT BYPASS

BACKGROUND

The present disclosure relates to Fibre Channel loops, and more specifically to detecting and bypassing node ports in an OLD-PORT state.

Electronic data systems are often interconnected using network communication systems. Approaches that have been developed for computer network architectures include area-wide networks and channels. Traditional networks (e.g., LAN's and WAN's) may offer flexibility and relatively large distance capabilities. Channels, such as the Enterprise System Connection (ESCON) and the Small Computer System Interface (SCSI), have been developed for high performance and reliability. Channels often use dedicated short-distance connections between computers or between computers and peripherals.

Features of both channels and networks have been incorporated into the Fibre Channel standard. Fibre Channel systems combine the speed and reliability of channels with the flexibility and connectivity of networks. Fibre Channel products often run at high data rates, such as 266 Mbps or 1062 Mbps. These speeds are sufficient to handle quite demanding applications, such as uncompressed, full motion, high-quality video.

There are at least three ways to deploy a Fibre Channel network, which include simple point-to-point connections, arbitrated loops, and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop (FC-AL) protocols provide for loop functionality in the interconnection of devices or loop segments through node ports. However, direct interconnection of node ports may be problematic since a failure at one node port in a loop may cause failure of the entire loop. This difficulty may be overcome in conventional Fibre Channel technology through the use of hubs. Hubs may include a number of hub ports interconnected in a loop topology. Node ports are connected to hub ports, forming a star topology with the hub at the center. Hub ports which are not connected to node ports or which are connected to failed node ports are bypassed. Therefore, the loop may be maintained despite removal or failure of node ports.

SUMMARY

The present disclosure includes a hub port in a Fibre Channel loop for detecting and bypassing attached node ports in an OLD-PORT state. The hub port includes a hub data source, a detect circuit, and an output control circuit.

The hub data source supplies data to the hub port from a Fibre Channel loop. The detect circuit is configured to detect a valid non-Arbitrated Loop sequence from an attached node port indicating that the node port is in an OLD-PORT state. The output control circuit operates to bypass the node port from the loop when the valid non-Arbitrated Loop sequence is detected.

The present disclosure also includes a method for detecting and-selectively bypassing an attached node port in an OLD-PORT state. The method includes detecting a valid non-Arbitrated Loop sequence from a node port, and appropriately bypassing the node port.

DETAILED DESCRIPTION

Figure 1:
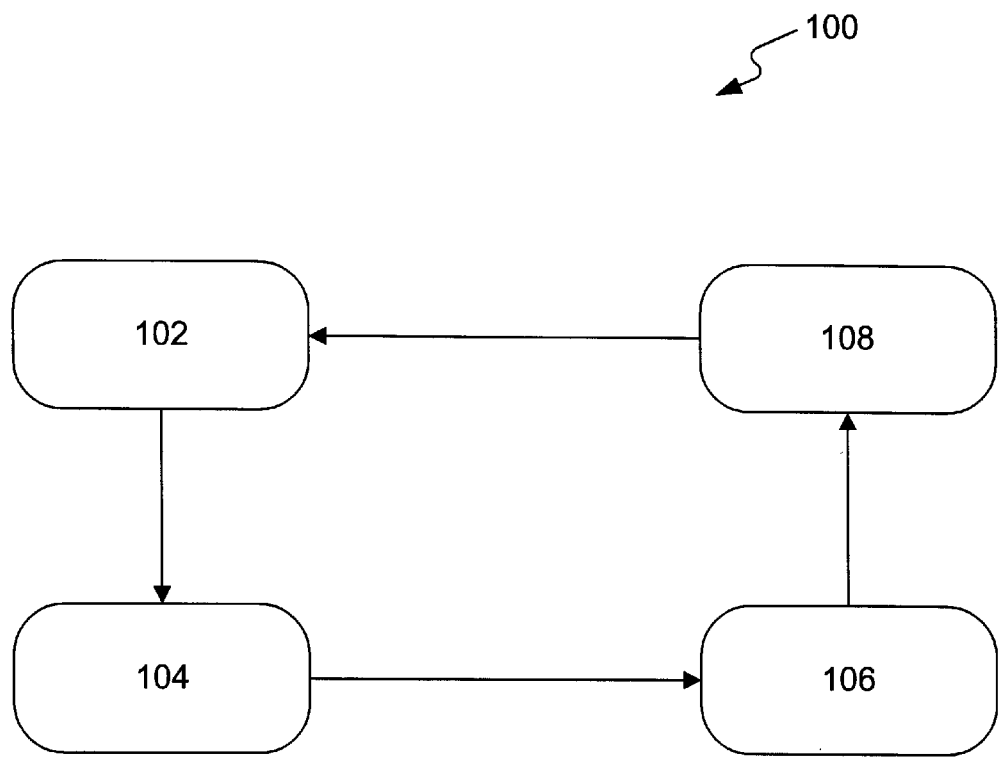
FIG. 1 shows a node port to node port loop.

A loop configuration 100 is illustrated in FIG. 1. Four node ports 102, 104, 106, 108 are shown joined together node port to node port. Each node port represents a connection to a device or to another loop. Node port 102 is connected to node port 104 such that data is transmitted from node port 102 to node port 104. Node port 104 is in turn connected to node port 106 that is in turn connected to node port 108. Node port 108 is connected to the first node port, node port 102. In this manner, a loop data path is established from node port 102 to node port 104 to node port 106 to node port 108 back to node port 102.

Figure 2:
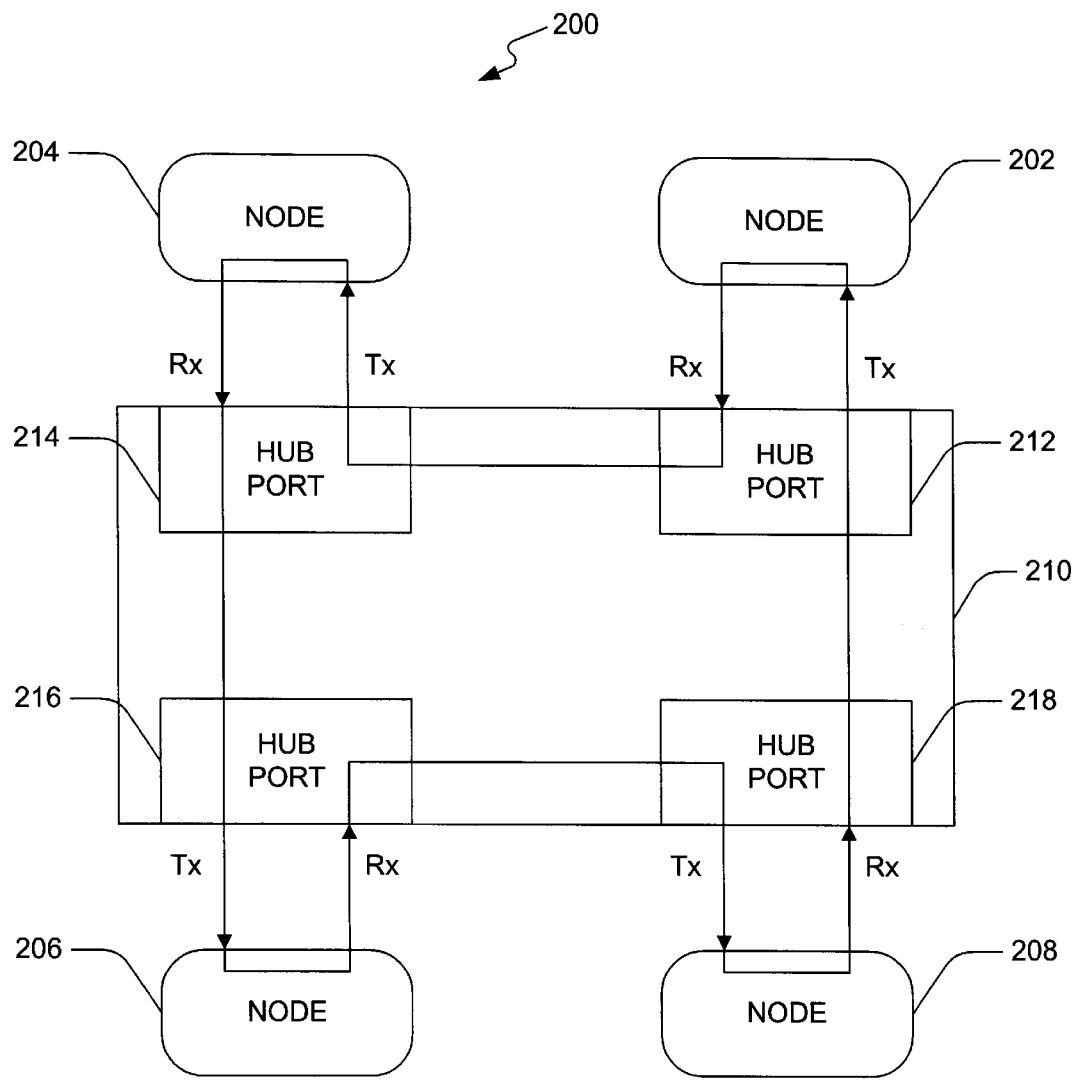
FIG. 2 shows a loop network including a hub.

FIG. 2 illustrates a loop 200 where node ports 202–208 are organized in a physical star topology with a hub 210 in the center. Node port 202 is connected to a hub port 212 in hub 210, as are node ports 204, 206, and 208 to their own respective hub ports 214, 216, and 218. A loop is internal to hub 210, where hub ports 212–218 form a loop data path similar to the loop configuration 100 shown in FIG. 1.

If there is a failure at any point in the loop, the data path may be broken and communication on the loop may halt. The loop may remain non-operational until the link is physically repaired. The use of a hub as a central component to a loop network may allow bypassing of certain hub ports. This can be useful when one or more hub ports are connected to node ports that have failed or have been configured as OLD-PORT nodes. Each hub port often contains circuitry that provides a bypass mode for the hub port. When a hub port is in bypass mode, data received by the hub port from the previous hub port in the loop may be passed directly to the next hub port in the loop.

When the loop and the node ports are powered up in Fibre Channel Arbitrated Loop (FC-AL) configuration, the node ports may establish a loop initialization protocol (LIP) by issuing LIP primitive sequences. Thus, when a node port receives a LIP primitive sequence, the node port may enter an OPEN-INIT state to select a loop master. However, if the LIP primitive sequence is not received, or is not recognized by a node port within a certain period of time, the node port may assume that the loop is not in an Arbitrated Loop environment. Therefore, the node port may enter a state, referred to as an OLD-PORT, in which the node port may attempt to operate the loop in a non-loop environment, such as in point-to-point mode.

Accordingly, when the node port is stuck in the OLD-PORT state, the port may attempt to establish a link in a non-loop environment. The node port may attempt to do this by continuously sending out ordered sets that may not be recognized by the other node ports that are operating in the loop configuration. Such ordered sets include Link Reset (LR), Link Reset Response (LRR), Not Operational (NOS), and Offline (OLS).

The LR ordered set is transmitted by a node port to initiate the Link Reset protocol or to recover from a Link Timeout. The LRR ordered set indicates that the node port is receiving and recognizing the LR ordered set. The NOS ordered set indicates that the node port transmitting this ordered set has detected a link failure condition or is offline, waiting for OLS ordered set to be received. The OLS ordered set indicates that the node port transmitting this ordered set is initiating the Link Initialization protocol, receiving and recognizing NOS Ordered set, or entering the Offline State.

Issuance of these ordered sets may disrupt the normal operation of the loop. Further, the issuance of the ordered sets may eventually place the entire loop into a non-operational state. To alleviate the problems caused by the issuance of these ordered sets, the node port that is stuck in the OLD-PORT state may be identified and physically disconnected from the loop. However, the procedure of identifying the node port that is in the OLD-PORT state may require a timing consuming, trial-and-error process. The process may involve removing one node port at a time from the loop and determining if the removal of the node port brings the loop into operation again.

In recognition of the above-described difficulties, it is determined that it would be advantageous to provide a system within a Fibre Channel hub that can automatically detect and isolate the OLD-PORT node. In one embodiment, illustrated in FIG. 3, the loop 300 detects and isolates the OLD-PORT node.

Figure 3:
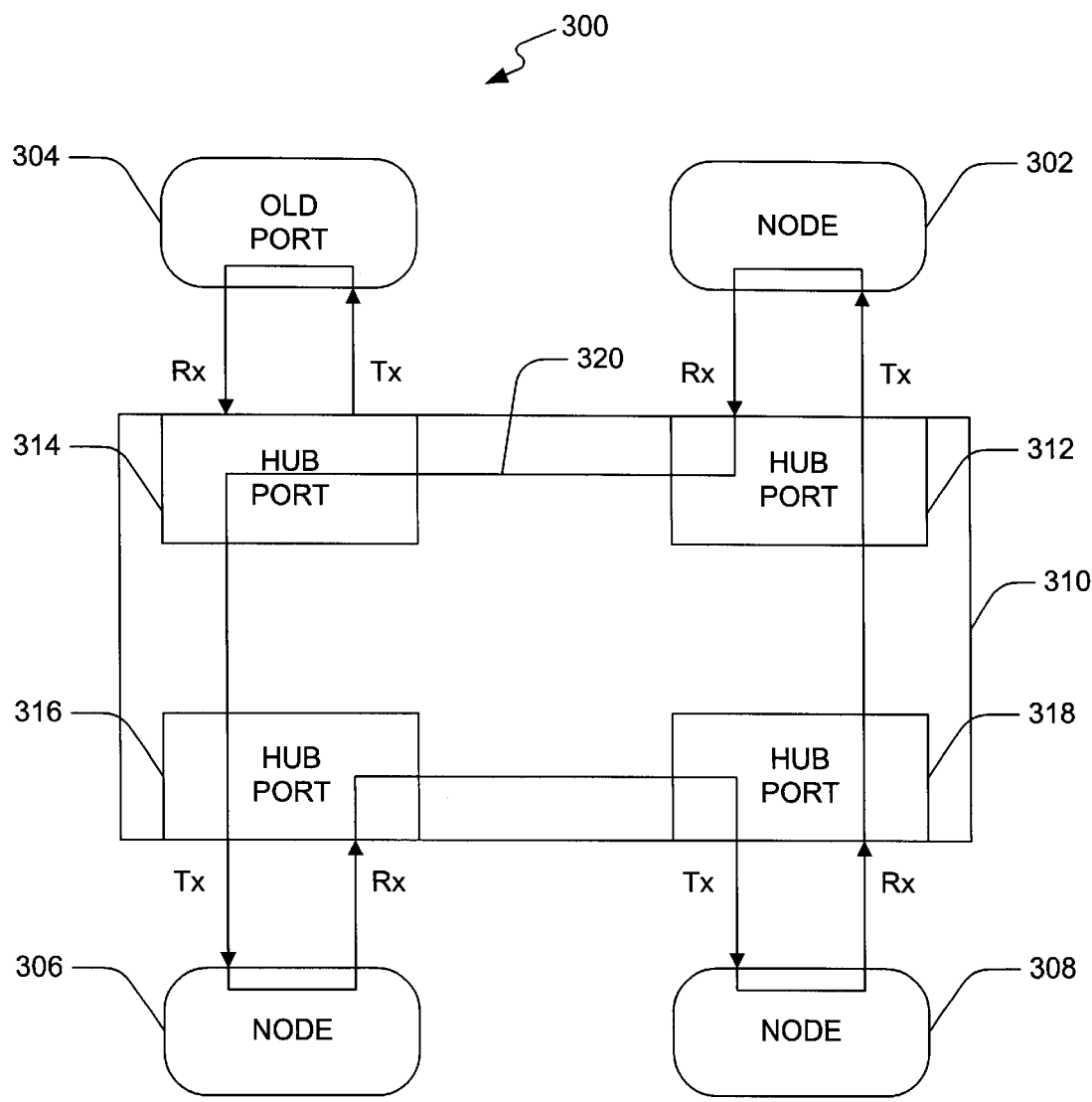
FIG. 3 shows a loop network with an OLD-PORT node bypassed.

FIG. 3 shows a Fibre Channel data path 320 through a hub 310 with the OLD-PORT node 304 isolated from the loop 300. In the illustrated embodiment, the node port 304 is the OLD-PORT node. Thus, the node port 304 is disconnected from the data path 320 by the hub port 314.

The hub port 314 may identify the attached node port 304 as the OLD-PORT node by monitoring the receive input from the node port 304. If any one of the above-identified ordered sets (LR, LRR, NOS, OLS) is detected, the hub port 314 may bypass the node port 304 by directly forwarding the data coming from the previous hub port 312 to the next hub port 316.

Substantially simultaneous with the bypassing of the node port 304, the hub 310 may attempt to awake the OLD-PORT node. This may be done by sending LIP primitive sequence through transmit output of the hub port 314 into the attached node port 304.

Receipt of the LIP primitive sequence at the receive input of the hub port 314 may indicate that the attached OLD-PORT node has corrected itself and is now operating in the loop configuration. The hub port 314 may then insert the attached node port 304 back into the loop at an appropriate time.

Figure 4:
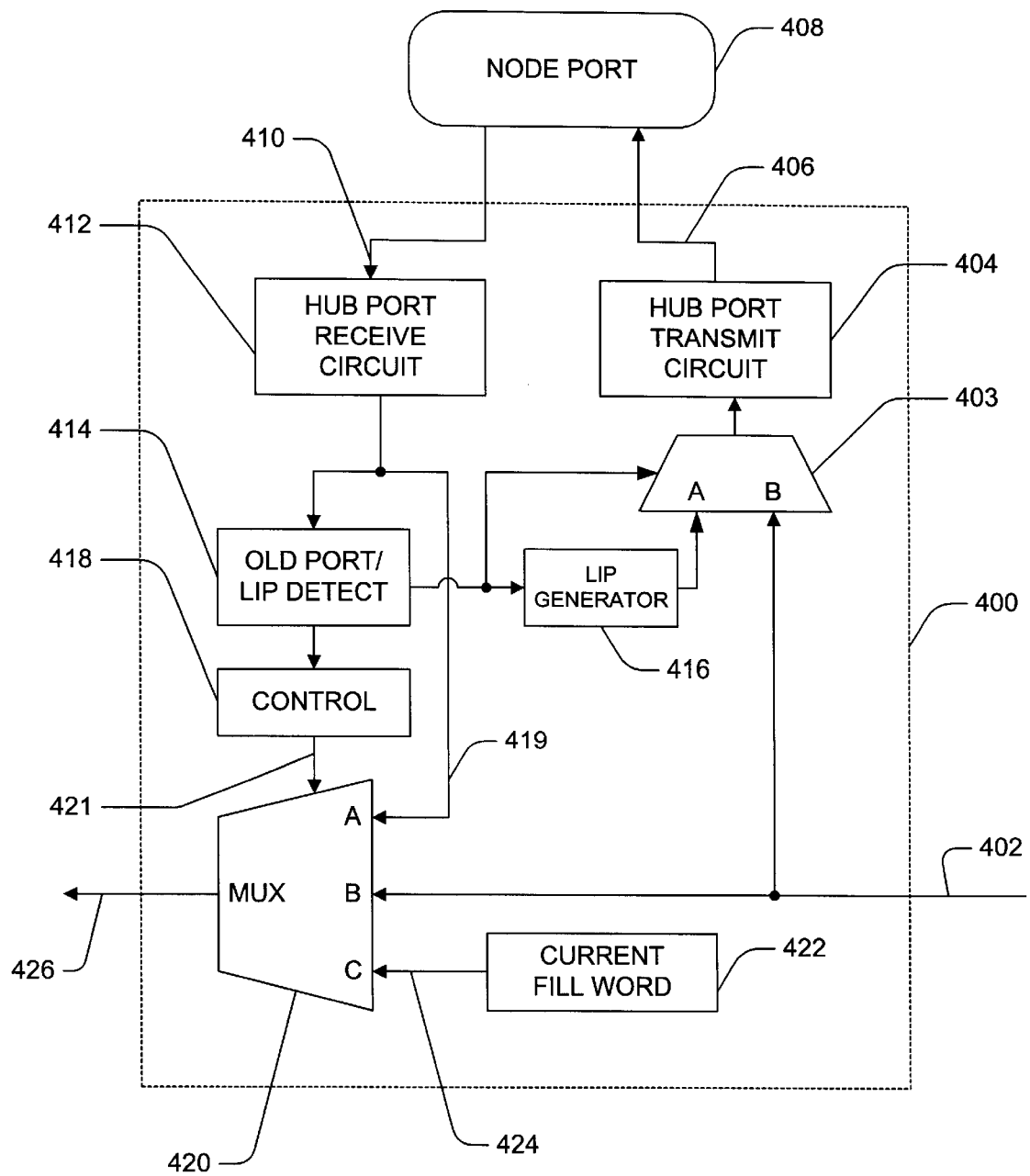
FIG. 4 is a block diagram of a hub port according to an embodiment.

FIG. 4 illustrates internal components of a hub port 400 according to an embodiment. In the illustrated embodiment, the hub port 400 provides for detection of an attached node port 408 that may be stuck in the OLD-PORT state.

The hub port 400 as shown in FIG. 4 is equivalent to hub port 314 shown in FIG. 3. An incoming internal hub link 402 enters the hub port 400 from a previous hub port in the loop (not shown). If the hub port 400 is not in a bypass mode, the incoming internal hub link 402 is connected to a hub port transmit circuit 404 through a data selector 403 such as a multiplexer. Thus, data from the previous hub port passes along the internal hub link 402 into the hub port 400 and then into the hub port transmit circuit 404. The hub port transmit circuit 404 sends the received data through a data channel 406 to an attached node port 408 after converting the data into a form usable by the node port 408. Alternatively, the data channel 406 may be connected to a hub port in a different hub, allowing interconnection of hub to hub.

The node port 408 outputs data to the hub port 400 via a data channel 410. The data channel 410 is connected to a hub port receive circuit 412, which monitors data coming through the hub port receive (Rx) inputs. The hub port receive circuit 412 converts data received from the node port 408 into a form usable inside the hub. In one embodiment, the hub port receive circuit 412 converts data from serial to parallel and decodes the data.

The hub port receive circuit 412 outputs data to an outgoing internal hub link 426 through a hub port output line 419 and a switching device 420 such as a multiplexer. The output of the hub port receive circuit 412 may also be routed to an OLD-PORT/LIP detect circuit 414.

The OLD-PORT/LIP detect circuit 414 provides for detection of incoming ordered sets originating from the attached node port 408. If any one of the non-Arbitrated Loop ordered sets (LR, LRR, NOS, OLS) is detected, the OLD-PORT/LIP detect circuit 414 may save the ordered set. If the OLD-PORT/LIP detect circuit 414 continuously receives two more consecutive non-Arbitrated Loop ordered sets that are identical to the first saved ordered set, the detect circuit 414 may indicate that the attached node port 408 is in an OLD-PORT state. The OLD-PORT/LIP detect circuit 414 may then signal the hub port output control circuit 418 to bypass the node port 408 by forwarding the incoming data directly to the next hub port in the loop.

The hub port output control circuit 418 outputs control signals via a hub port output control line 421. The hub port output line 419 is connected to a first input A of the switching device 420. The incoming internal hub link 402 is connected to a second input B of the switching device 420. A current fill word generator 422 is connected to a third input C of the switching device 420. The hub port output control line 421 is connected to a control input of the switching device 420. The switching device 420 selects a single input A, B, or C to be output depending upon the control signal generated by the hub port output control circuit 418. The switching device 420 output is sent to the outgoing internal hub link 426. The outgoing internal hub link 426 passes data to the next hub port in the hub in the same manner that the internal hub link 402 passes into the hub port 400, forming a loop.

When no non-Arbitrated Loop ordered sets are detected, the hub port output control circuit 418 may pass the data coming from the attached node port 408 to the outgoing internal hub link 426 through the first input A of the switching device 420. When a first non-Arbitrated Loop ordered set is detected, the hub port output control circuit 418 may replace the ordered set with a fill word from the current fill word generator 422. The fill word is sent out to the outgoing internal hub link 426 in place of the detected ordered set through the C input of the switching device 420. Another fill word may be sent out if a second non-Arbitrated Loop ordered set identical to the first ordered set is received.

If two more consecutive non-Arbitrated Loop ordered sets that are identical to the first ordered set are detected, the hub port output control circuit 418 may place the hub port in a bypass mode by selecting the second input B of the switching device 420. The selection forwards the incoming internal hub link data from a previous hub port to a next hub port through the outgoing internal link 426.

Once the non-Arbitrated Loop ordered set is detected, the OLD-PORT/LIP detect circuit 414 may also signal a LIP generator 416 to generate a loop initialization sequence. The loop initialization sequence may be sent to the attached node port 408 to awake the node port 408 from the OLD-PORT state. The signal from the detect circuit 414 also selects an A input on the data selector 403 to pass the LIP sequence to the attached node port 408 through the transmit circuit 404. The selection of the A input also disables the incoming internal hub link data from being passed to the node port 408.

The OLD-PORT/LIP detect circuit 414 is also configured to detect loop initialization primitive sequences from the attached node port 408. If the circuit 414 detects a valid loop initialization primitive sequence, the circuit 414 may signal the hub port output control circuit 418 to appropriately "cut in" or reconnect the attached node port 408 by again selecting the A input of the switching device 420.

Figure 5:
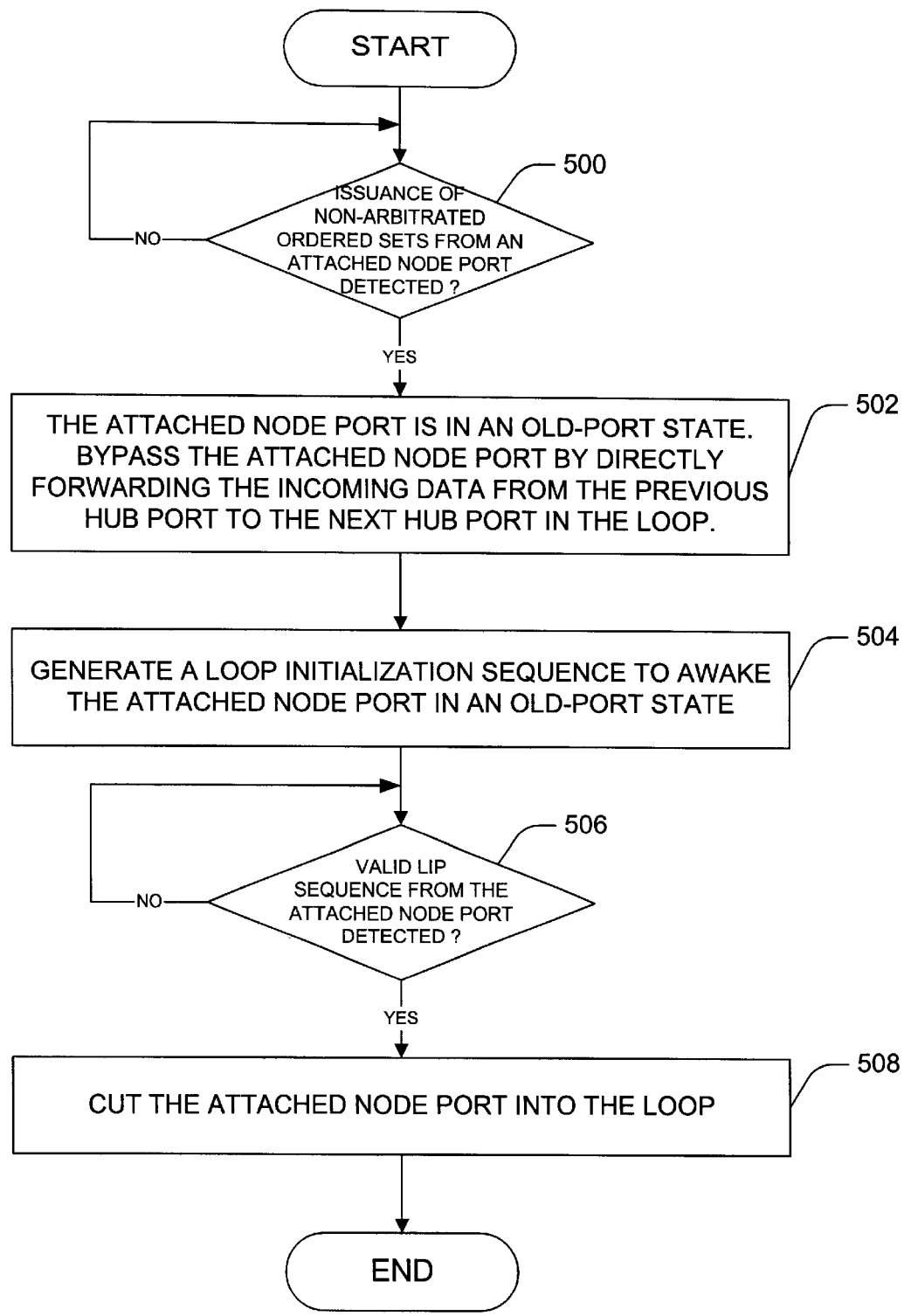
FIG. 5 shows a method for detecting and bypassing node ports in an OLD-PORT state according an embodiment.

FIG. 5 illustrates a method for detecting and bypassing node ports in an OLD-PORT state. The method includes monitoring to detect an issuance of non-Arbitrated Loop ordered sets from an attached node port at 500. If the non-Arbitrated Loop ordered sets are detected, the attached node port is in an OLD-PORT state. Thus, the attached node port is bypassed by directly passing the incoming data from the previous hub port to the next hub port at 502.

A loop initialization sequence is generated at 504 to awake the attached node port in an OLD-PORT state. If a valid LIP sequence from the attached node port is detected at 506, the attached node port may be cut into the loop at 508.

While specific embodiments of the invention have been illustrated and described, other embodiments and variations are possible. For example, although the present disclosure is described in terms of specific ordered sets that are detected to indicate an OLD-PORT node, other ordered sets may be monitored to detect other node states.

All these are intended to be encompassed by the following claims.

What is claimed is:

1. A hub port in a Fibre Channel loop, comprising:
   a hub data source for supplying data to the hub port from the Fibre Channel loop;
   a detect circuit configured to detect a valid non-Arbitrated Loop sequence from an attached node port indicating that the node port is in a mode for operating in a non-Arbitrated loop environment, said valid non-Arbitrated Loop sequence comprising a first non-Arbitrated Loop sequence followed by at least two more consecutive non-Arbitrated Loop sequences substantially similar to the first sequence; and
   an output control circuit operating to bypass the node port from the loop when the valid non-Arbitrated Loop sequence is detected.

2. A hub port in a Fibre Channel loop, comprising:
   a hub data source for supplying data to the hub port from the Fibre Channel loop;
   a detect circuit configured to detect a valid non-Arbitrated Loop sequence from an attached node port indicating that the node port is in an OLD-PORT state; and
   an output control circuit operating to bypass the node port from the loop when the valid non-Arbitrated Loop sequence is detected,
   wherein said non-Arbitrated Loop sequence includes Link Reset (LR), Link Reset Response (LRR), Not Operational (NOS), and Offline (OLS) ordered sets.

3. A hub port in a Fibre Channel loop, comprising:
   a hub data source for supplying data to the hub port from the Fibre Channel loop;
   a detect circuit configured to detect a valid non-Arbitrated Loop sequence from an attached node port indicating that the node port is in an OLD-PORT state; and
   an output control circuit operating to bypass the node port from the loop when the valid non-Arbitrated Loop sequence is detected,
   wherein said detect circuit indicates detection of said valid non-Arbitrated Loop sequence if said detect circuit detects a first non-Arbitrated Loop sequence followed by at least two more consecutive non-Arbitrated Loop sequences substantially similar to the first sequence.

4. The hub port of claim 3, further comprising:
   a memory configured to store the first detected non-Arbitrated Loop sequence.

5. The hub port of claim 3, further comprising:
   a fill-word generator operating to generate and transmit fill-words in place of the detected non-Arbitrated Loop sequences.

6. The hub port of claim 5, further comprising:
   a data selection device configured to selectively direct data from an appropriate data source to the Fibre Channel loop in accordance with a control signal from said output control circuit.

7. The hub port of claim 6, wherein said appropriate data source includes the hub data source, the attached node port, and the fill-word generator.

8. The hub port of claim 1, further comprising:
   a loop initialization sequence generator configured to generate a loop initialization sequence, where said sequence is sent to awake the attached node port when the node port is determined to be in an OLD-PORT state.

9. The hub port of claim 8, wherein said detect circuit operates to detect a valid LIP primitive sequence from the attached node port, after the loop initialization sequence generator sends the loop initialization sequence.

10. A hub port in a Fibre Channel loop, comprising:
    a hub data source for supplying data to the hub port from the Fibre Channel loop;
    a detect circuit configured to detect a valid non-Arbitrated Loop sequence from an attached node port indicating that the node port is in an OLD-PORT state said valid non-Arbitrated Loop sequence comprising a first non-Arbitrated Loop sequence followed by at least two more consecutive non-Arbitrated Loop sequences substantially similar to the first sequence;
    an output control circuit operating to bypass the node port from the loop when the valid non-Arbitrated Loop sequence is detected;
    a fill-word generator operating to generate and transmit fill-words in place of the detected non-Arbitrated Loop sequences; and
    a data selection device configured to selectively direct data from an appropriaate data source to the Fibre Channel loop in accordance with a control signal from said output control circuit.

11. A Fibre Channel loop having a hub, comprising:
    a plurality of node ports;
    a plurality of hub ports in the hub, each hub port coupled to one of said plurality of node ports, each hub port including:
      a hub data source for supplying data to the hub port from the Fibre Channel loop;

a detect circuit configured to detect a valid non-Arbitrated Loop sequence from an attached node port indicating that the node port is in an OLD-PORT state, said valid non-Arbitrated Loop sequence comprising a first non-Arbitrated Loop sequence followed by at least two more consecutive non-Arbitrated Loop sequences substantially similar to the first sequence; and an output control circuit operating to bypass the node port from the loop when the valid non-Arbitrated Loop sequence is detected.

12. A method for detecting and bypassing node ports in an OLD-PORT state, comprising:

detecting a valid non-Arbitrated Loop sequence from a node port, said valid non-Arbitrated Loop sequence comprising a first non-Arbitrated Loop sequence followed by at least two more consecutive non-Arbitrated Loop sequences substantially similar to the first sequence; and appropriately bypassing the node port in response to detecting said valid non-Arbitrated Loop sequence.

13. The method of claim 12, wherein said appropriately bypassing includes forwarding data received from previous hub port directly to next hub port.

14. A method for detecting and bypassing node ports in an OLD-PORT state, comprising:

detecting a valid non-Arbitrated Loop sequence from a node port; and appropriately bypassing the node port, wherein said detecting said valid non-Arbitrated Loop sequence includes monitoring to detect at least three identical and consecutive Link Reset (LR), Link Reset Response (LRR), Not Operational (NOS), or Offline (OLS) ordered sets.

15. A method for detecting and bypassing node ports in an OLD-PORT state, comprising:

detecting a valid non-Arbitrated Loop sequence from a node port; and appropriately bypassing the node port; and generating and transmitting a loop initialization sequence to awake the node port in the OLD-PORT state.

16. The method of claim 15, further comprising:

cutting the node port into the Fibre Channel loop if a valid LIP sequence is received from the node port.

17. The method of claim 16, wherein said cutting in includes re-attaching the bypassed node port into the Fibre Channel loop.

18. A method for detecting and bypassing node ports in an OLD-PORT state, comprising:

detecting a valid non-Arbitrated Loop sequence from a node port, said valid non-Arbitrated Loop sequence comprising a first non-Arbitrated Loop sequence followed by at least two more consecutive non-Arbitrated Loop sequences substantially similar to the first sequence;

appropriately bypassing the node port in response to said detecting;

generating and transmitting a loop initialization sequence to awake the node port in the OLD-PORT state; and cutting the node port into the Fibre Channel loop if a valid LIP sequence is received from the node port.

19. An apparatus comprising a machine-readable storage medium having executable instructions that enable the machine to:

detect a valid non-Arbitrated Loop sequence from a node port, said valid non-Arbitrated Loop sequence comprising a first non-Arbitrated Loop sequence followed by at least two more consecutive non-Arbitrated Loop sequences substantially similar to the first sequence; and appropriately bypass the node port in response to said detecting.

20. An apparatus comprising a machine-readable storage medium having executable instructions that enable the machine to:

detect a valid non-Arbitrated Loop sequence from a node port;

appropriately bypass the node port;

generate and transmit a loop initialization sequence to awake the node port in the OLD-PORT state; and cut the node port into the Fibre Channel loop if a valid LIP sequence is received from the node port.

* * * * *